(12) United States Patent
Mörsky et al.

(10) Patent No.: US 11,416,041 B2
(45) Date of Patent: Aug. 16, 2022

(54) DEVICE HAVING DISPLAY INTEGRATED INFRARED AND VISIBLE LIGHT SOURCE

(71) Applicant: Microsoft Technology Licensing, LLC, Redmond, WA (US)

(72) Inventors: Tuomo Mörsky, Lempäälä (FI); Tomi Lintulahti, Kangasala (FI); Mikko Perälä, Regensburg (DE)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 15/162,474

(22) Filed: May 23, 2016

(65) Prior Publication Data

US 2017/0336836 A1 Nov. 23, 2017

(51) Int. Cl.

| | | |
|---|---|---|
| G06F 21/32 | (2013.01) | |
| G06F 1/16 | (2006.01) | |
| G02F 1/13357 | (2006.01) | |
| G06V 10/143 | (2022.01) | |
| G06V 40/19 | (2022.01) | |
| G06V 40/16 | (2022.01) | |

(Continued)

(52) U.S. Cl.
CPC ......... *G06F 1/1684* (2013.01); *G02B 6/0091* (2013.01); *G02F 1/1336* (2013.01); *G06F 21/32* (2013.01); *G06V 10/143* (2022.01); *G06V 40/166* (2022.01); *G06V 40/19* (2022.01); *G02F 1/133602* (2013.01); *G02F 1/133615* (2013.01); *G02F 2001/133624* (2013.01); *G02F 2001/133626* (2013.01); *G06V 10/17* (2022.01); *G06V 40/1312* (2022.01); *G06V 40/16* (2022.01); *G06V 40/18* (2022.01)

(58) Field of Classification Search
None
See application file for complete search history.

(56) References Cited

U.S. PATENT DOCUMENTS 7,630,522 B2 12/2009 Popp et al.
8,514,095 B2 8/2013 Greer et al.
(Continued)

FOREIGN PATENT DOCUMENTS

CN 101021898 A 8/2007
CN 101153972 A 4/2008
(Continued)

OTHER PUBLICATIONS

Silbert, Sarah, "Fujitsu Eye-Tracking Tech uses Built-in Motion Sensor, Infrared LED for Hands-Free Computing (Video)", Published on: Oct. 2, 2012, 11 pages, Available at: http://www.engadget.com/2012/10/02/fujitsu-eye-tracking-tech-built-in/.

(Continued)

*Primary Examiner* — Amr A Awad
*Assistant Examiner* — Donna V Lui (57) ABSTRACT

In an embodiment, device having display integrated infrared and light source is disclosed. In an embodiment, the device comprises a display, comprising: a visible light source; and an infrared source, the visible light source and the infrared source being integrated into a single radiation source component within the display, and the infrared source emitting an infrared radiation biometrically authenticating a user of the device. In another embodiment a display integrated infrared source is disclosed.

20 Claims, 11 Drawing Sheets

(51) Int. Cl.
*F21V 8/00* (2006.01)
*G06V 10/10* (2022.01)
*G06V 40/18* (2022.01)
*G06V 40/13* (2022.01)

(56) References Cited

U.S. PATENT DOCUMENTS

| | | | |
|---|---|---|---|
| 8,624,810 B2 | 1/2014 | Ahn et al. | |
| 8,780,088 B2 | 7/2014 | Boer et al. | |
| 8,998,414 B2 | 4/2015 | Bohn | |
| 9,066,125 B2 | 6/2015 | Sands et al. | |
| 9,158,113 B2 | 10/2015 | Amirparviz et al. | |
| 9,214,600 B2 | 12/2015 | Mandl et al. | |
| 2006/0065989 A1* | 3/2006 | Druffel | B29C 35/0805 264/1.32 |
| 2009/0159786 A1 | 6/2009 | Yang et al. | |
| 2009/0295744 A1* | 12/2009 | Onishi | G06F 3/0412 345/173 |
| 2009/0295760 A1* | 12/2009 | Linge | G06F 3/0412 345/179 |
| 2010/0007632 A1 | 1/2010 | Yamazaki | |
| 2010/0060611 A1 | 3/2010 | Nie | |
| 2011/0043490 A1 | 2/2011 | Powell et al. | |
| 2012/0169669 A1* | 7/2012 | Lee | H04N 5/2254 345/175 |
| 2012/0229422 A1 | 9/2012 | Hwang et al. | |
| 2012/0268701 A1* | 10/2012 | Nemoto et al. | |
| 2013/0181896 A1* | 7/2013 | Gruhlke et al. | |
| 2014/0022156 A1 | 1/2014 | Han et al. | |
| 2014/0085245 A1 | 3/2014 | Baldwin et al. | |
| 2014/0192023 A1 | 7/2014 | Hoffman | |
| 2015/0015478 A1 | 1/2015 | Hoffman | |
| 2015/0080077 A1* | 3/2015 | Miller | A63F 1/18 463/11 |
| 2015/0109214 A1 | 4/2015 | Shi et al. | |
| 2015/0199072 A1 | 7/2015 | Zhang | |
| 2015/0310251 A1 | 10/2015 | Wyrwas et al. | |
| 2015/0317464 A1 | 11/2015 | Willis et al. | |
| 2015/0364107 A1 | 12/2015 | Sakariya et al. | |
| 2016/0124539 A1* | 5/2016 | Giacomini | G06F 3/0412 345/175 |
| 2016/0266721 A1* | 9/2016 | Kurokawa | G06F 3/0412 |
| 2017/0124376 A1* | 5/2017 | Wyrwas | G06K 9/00013 |

FOREIGN PATENT DOCUMENTS

| | | |
|---|---|---|
| CN | 101960372 A | 1/2011 |
| CN | 203363796 U | 12/2013 |
| CN | 103293673 B | 1/2015 |
| CN | 105320867 A | 2/2016 |
| WO | 2009060423 A1 | 5/2009 |

OTHER PUBLICATIONS

"International Search Report and Written Opinion Issued in PCT Application No. PCT/US2017/032997", dated Oct. 11, 2017, 19 Pages.

"Office Action Issued in European Patent Application No. 17734540.2", dated Mar. 19, 2020, 12 Pages.

"Office Action and Search Report Issued in China Patent Application No. 201780031732.9", dated Feb. 1, 2021, 14 Pages.

"First Examination Report Issued in Indian Patent Application No. 201847038906", dated Feb. 1, 2021, 9 Pages.

Second Office Action Issued in Chinese Patent Application No. 201780031732.9, dated Oct. 11, 2021, 7 Pages.

"Third Office Action and Search Report Issued in Chinese Patent Application No. 201780031732.9", dated Apr. 13, 2022, 14 Pages.

* cited by examiner

DEVICE HAVING DISPLAY INTEGRATED INFRARED AND VISIBLE LIGHT SOURCE

BACKGROUND

In consumer handheld and portable device there is a trend of making the device smaller and lighter, while increasing operations and functionalities of such device. The space within the device has become a scare resource. When designing and manufacturing the device, the scarce physical space resources need to be considered. A display of the device reserves a lot of space. While it plays an important role for usability of the portable electrical device, nearly one side of the device is occupied by the display in the device appearance. Electronics of the display continues and protrudes from the surface of the side inside the device. Furthermore some additional components, such as camera detectors, may be located next to the display, rendering the display side wider and longer and requiring additional space on the display side, which is not related to the visible and dominating display.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, device having display integrated infrared and light source is disclosed. In an embodiment, the device comprises a display, comprising: a visible light source; and an infrared source, the visible light source and the infrared source being integrated into a single radiation source component within the display, and the infrared source emitting an infrared radiation biometrically authenticating of a user of the device.

Another embodiment relates to a device, comprising: an infrared detector; and a display, comprising: a backlight comprising a visible light source and infrared source; and a light guide panel, wherein the light guide panel is configured to guide radiation from the backlight from a parallel direction to a transversal direction with respect to the display; wherein the display is configured to allow infrared radiation to pass through it and the infrared detector is configured to receive reflected infrared radiation from a user of the device for biometric authentication of the user.

Another embodiment relates to a mobile device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments may be described and illustrated herein as being implemented in a smartphone or a mobile phone, these are only examples of a device having a display integrated radiation source for biometric authentication. The present embodiments are suitable for application in a variety of different types of devices, for example, in tablets, phablets, computers, cameras, game consoles, small laptop computers, smart watches, wearable devices or other devices that have a display. The term 'computer', 'computing-based device', 'device' or 'mobile device' is used herein to refer to a device with processing capability such that it can execute instructions or has hardware logic. Such processing capabilities are incorporated into many different devices.

Security and privacy are concerns that users have regarding their devices, particularly smartphones, tablets and computers. Biometric security and authentication may be a feasible method of authentication preventing unauthorized use of a device. Biometric authentication is becoming a popular feature in devices, particularly portable devices. For biometric authentication, for example fingerprint scanning or iris scanning, infrared, IR, radiation may be used to illuminate the subject and recognition may be done by capturing and analyzing the reflected IR radiation patterns and comparing it to stored and authenticated information. IR radiation may improve the biometric authentication. Biometrics of the user may be more distinctive and easier to distinguish by using IR radiation for source and detector. Environmental conditions, such as the amount of daylight or other conditions may not disturb the authentication. Furthermore, IR radiation may reliably reveal details of the user for the biometric authentication. Furthermore, IR radiation based detection may detect the biometric features of a subject and ignore the subject accessories such as glasses, hats, or make up, etc.

A device may employ an IR radiation source, configured on the front of the device, besides a display of the device. The display of a device may be a backlit liquid crystal display, LCD. An LCD display uses the light-modulating properties of liquid crystals. Liquid crystals do not emit light directly and hence the need for backlighting. A visible light source such as an LED may be used for backlighting an LCD display.

According to an embodiment infrared, IR, source and visible light source, such as a light emitting diode, LED, are integrated into a single unit, for example IR-LED. According to another embodiment IR source and VL source are integrated into the display as a side shooting sources as separate units. The integrated IR-LED or the separate sources are further integrated as a part of a display illuminating package, such as the display LED package. A display filter is configured to pass IR radiation through, and consequently IR radiation passes through the display. The IR source is configured to emit radiation for the biometric authentication of the user. Consequently, radiation source for biometric authentication may be integrated into the display and into the illumination package of the display. Because beam of IR source for biometric authentication should be large, typically the display side of the device has an opening for the IR source. When the IR source is integrated to the display and/or to the LED source within the display, there is no need to have an opening at the display side for the IR source at all. Physical space within the display, and within the device, may be saved due to higher degree of integration. This may enable reduction of the size of a bezel around the display, particularly around the shorter edges of the display. The IR source may be hidden from the user so that it is not visible or it is very difficult to detect when the user inspects the device. This may improve aesthetics of the device. Since IR is invisible to human eye, the user may not be even aware when the device is carrying out biometric authentication.

According to an embodiment, a single device comprises the display integrated IR source and VL source, and an IR detector. Consequently, the single device may process and perform the biometric authentication. This is convenient for portable and hand-held device, as there is no need to couple or connect them for any auxiliary device for this purpose.

According to an embodiment, the device comprises an IR detector. The IR detector is configured to receive reflected infrared radiation for biometric authentication of the user of the device. When IR source emits IR radiation from the display, it falls on a body part of the user, for example a finger or an eye or the face or any other body part which can be uniquely identified. The IR radiation is reflected back to the device and IR detector receives the reflected IR radiation. The received IR radiation is used for biometric authentication of the user. IR detector may be located within the device. IR detector may be integrated into the display. However, it is not necessary to have the IR detector at the display or integrated into the display. According to an embodiment, IR detector is located next to the display or at the display side of the device. IR detector is connected to biometric authentication module, which is configured to carry out biometric authentication of the user within the device. The biometric authentication system may be implemented either in hardware or at least partially in software.

Figure 1:
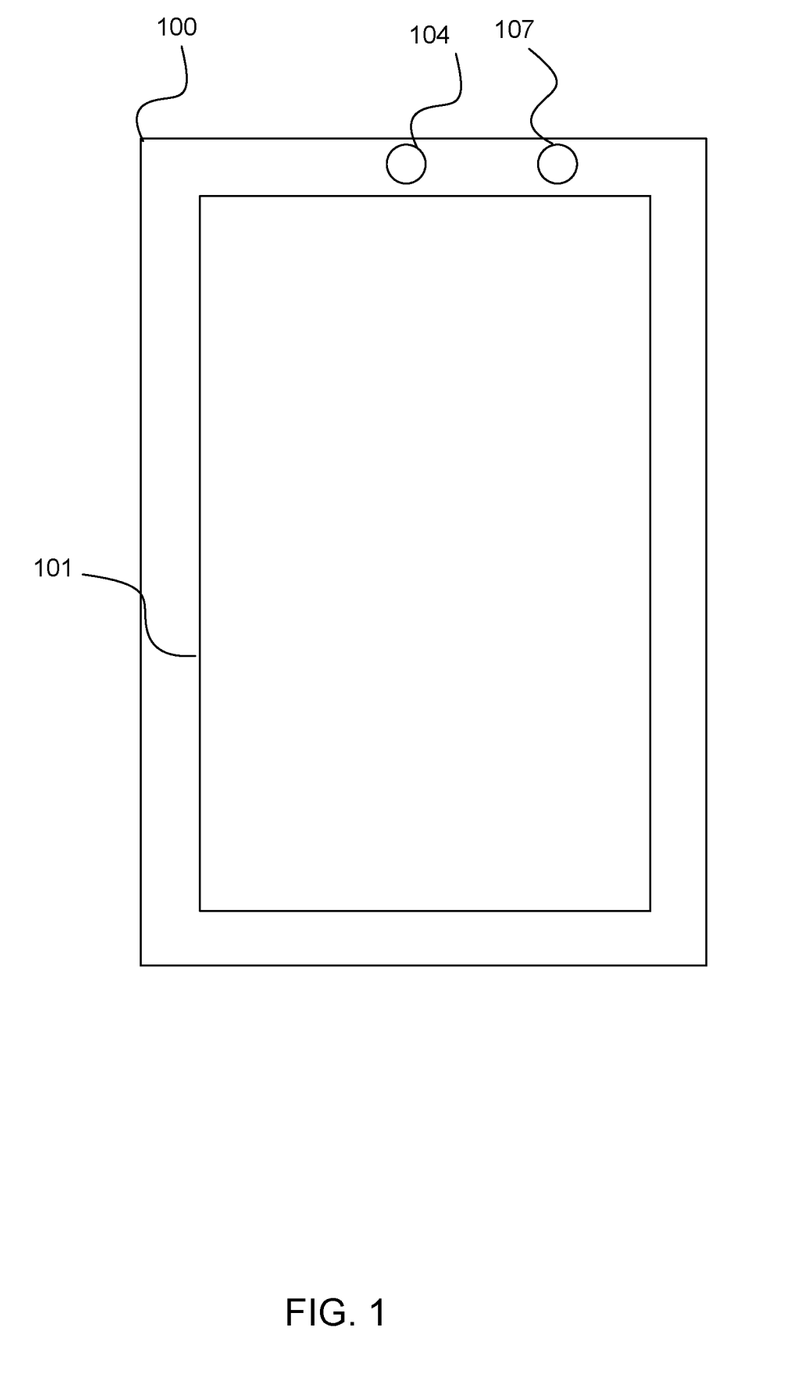
FIG. 1 illustrates a schematic representation of a top view of a device comprising a display integrated infrared and visible light source for biometric authentication, according to an embodiment.

FIG. 1 illustrates a schematic representation of a cross-section of a device 100 comprising a display 101 configured to a biometric authentication, according to an embodiment.

Device 100 comprises a display 101. According to an embodiment the display 101 may be an LCD display. The display 101 comprises a display integrated visible light, VL, source and IR source. The device 100 comprise other components like a front facing camera 104, an IR detector 107 or other components configured on the same side as the display 101, for example, above the display near the upper edge of the device 100. It should be noted that upper is used in a relative manner and only as an embodiment, and is intended to indicate the top portion of the device when the device 100 is disposed such that the display 101 is vertical. The other components may be located next to the display 101. It should be noted that according to an embodiment the side having the display 101 may not have other components, for example the IR detector 107 may be integrated into the display 101.

According to an embodiment, a need for a discrete IR source on the front of a device 100 may be eliminated, because the IR source may be integrated into the display 100. According to an embodiment, smaller bezels around a display 101 may be implemented. According to an embodiment, size of the device 100 may be reduced, and possibly aesthetics of the device may be improved.

Figure 2:
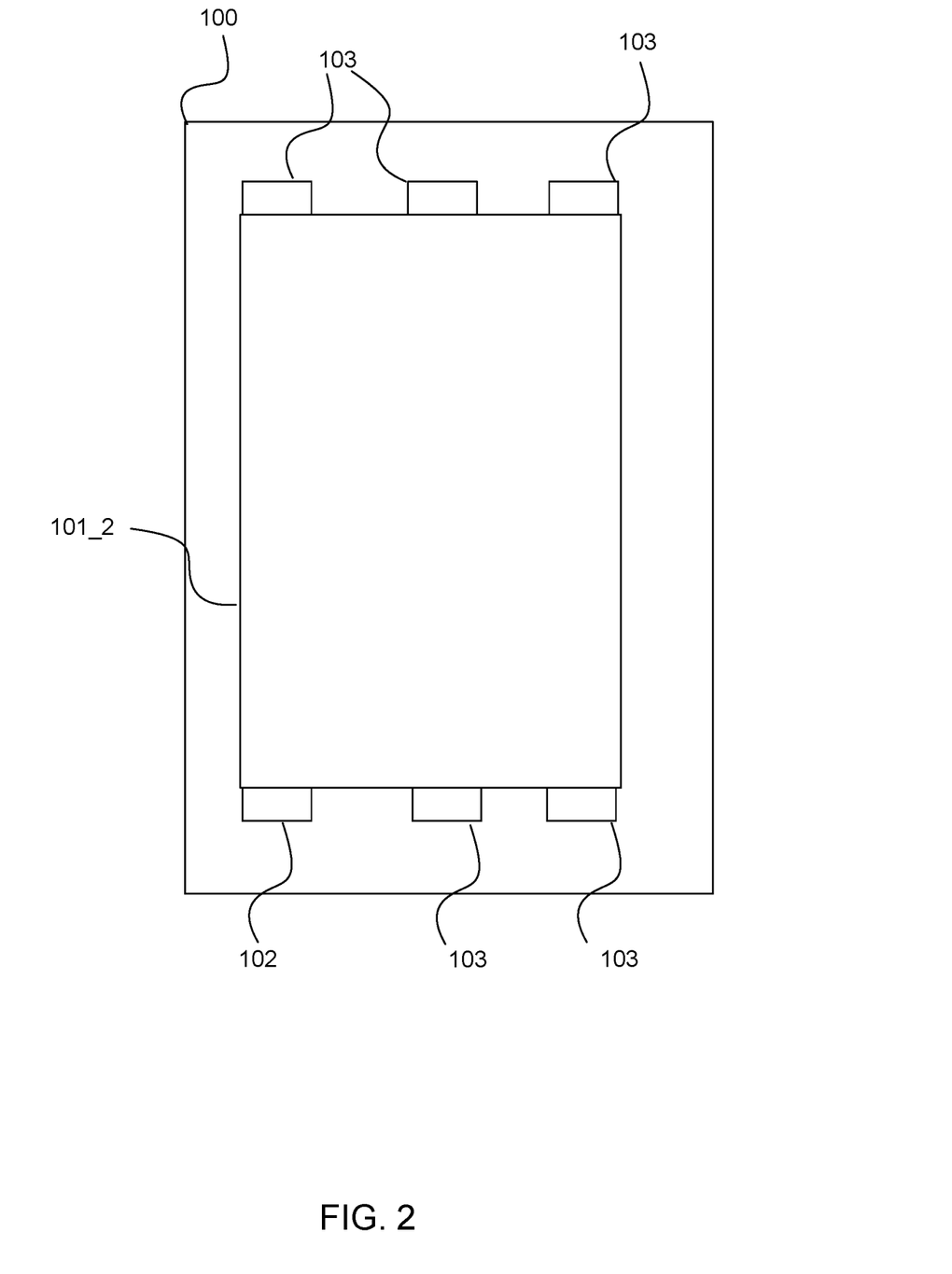
FIG. 2 illustrates a schematic representation of a cross-section of a top view of a device comprising a light guide panel of the display having infrared and visible light source for biometric authentication, according to an embodiment.

FIG. 2 illustrates a schematic representation of a cross-section of a device 100 comprising a light guide panel 101_2 having an integrated visible light and infrared, IR, source 102 for biometric authentication, according to an embodiment.

Display 101 comprises a light guide panel 101_2. The light guide panel 101_2 may conform to the shape of the display 101 and be thin and flat. The display 101 comprises an integrated visible light, VL, source and IR source 102. The integrated VL and IR source 102 may be a single radiation source component that is configured to emit visible light and IR radiation through the light guide panel 101_2 and through the display 101. The display 101 may also comprise additional VL sources 103. The VL source 103 may be a side shooting light emitting diode, LED configured to emit red, R, green, G, and blue, B, light. IR source may emit thermal radiation and/or near IR spectrum range radiation, which is configured for biometric authentication. The source 102, having the integrated VL and IR source, may be a side shooting IR-LED configured to emit both visible light and IR radiation.

According to an embodiment, IR radiation component of the integrated light source 102 may be turned on only, when authentication is needed. When display 101 is used normally, VL sources are on and IR source may be off. When biometric authentication is used, only IR source is on and VL source may be off. According to an embodiment, a need for a discrete IR source on the front of a device 100 may be eliminated. According to an embodiment, smaller bezels around a display 101 may be implemented. According to an embodiment, size of the device may be reduced, and possibly aesthetics of the device may be improved. Embodiment of the side-shooting sources may have a thin display 101, wherein sources 102 and 103 are located around light guide panel 101_2. The light guide panel 101_2 redirects the radiation coming from the sources 102, 103 upwards towards the user.

Figure 3:
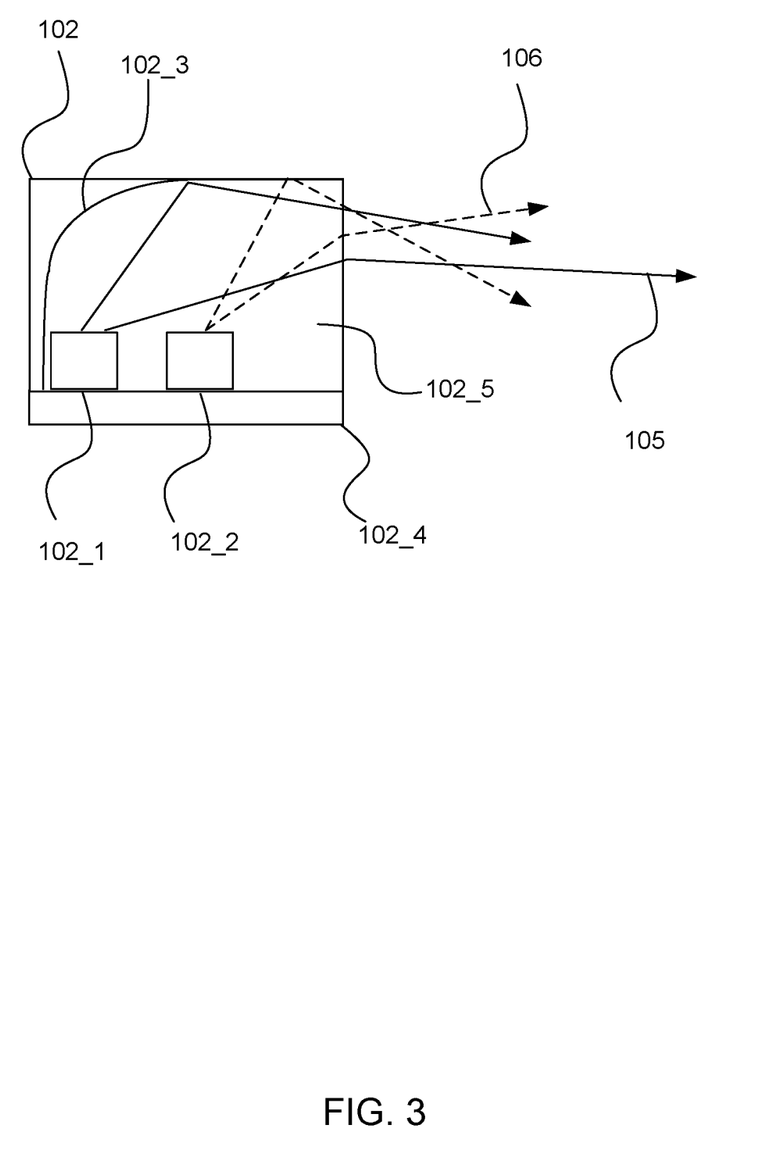
FIG. 3 illustrates a schematic representation of a cross-section of a side view of a radiation source comprising integrated visible light source and infrared source according to an embodiment.

FIG. 3 illustrates a schematic representation of a cross-section of a side view of a radiation source 102 comprising integrated visible light, VL, source and infrared, IR, source according to an embodiment.

The integrated VL and IR source 102 comprises VL component 102_1 and IR component 102_2. The components are integrated within a single radiation source 102 for the display 101 as a single electronics component. The single source 102 may be integrated into the display 101. VL component 102_1 emits visible light radiation 105. IR component 102_2 emits IR radiation 106. According to an embodiment, the source 102 may be a single electronics component, such as a chip, having both VL component 102_1 and IR component 102_2 that are integrated into the same chip. Embodiment of FIG. 3 illustrates a side shooting source 102. It comprises a reflector 102_3 configured to direct the radiation output from a side of the source 102. The outputting side may face and/or be in contact with an edge of the light guide panel 101_2 as illustrated in FIG. 2. The integrated VL and IR source 102 comprises a common substrate 102_4 for the components 102_1,102_2. Furthermore phosphor 102_5 may be used as a filling within the source 102.

Figure 4:
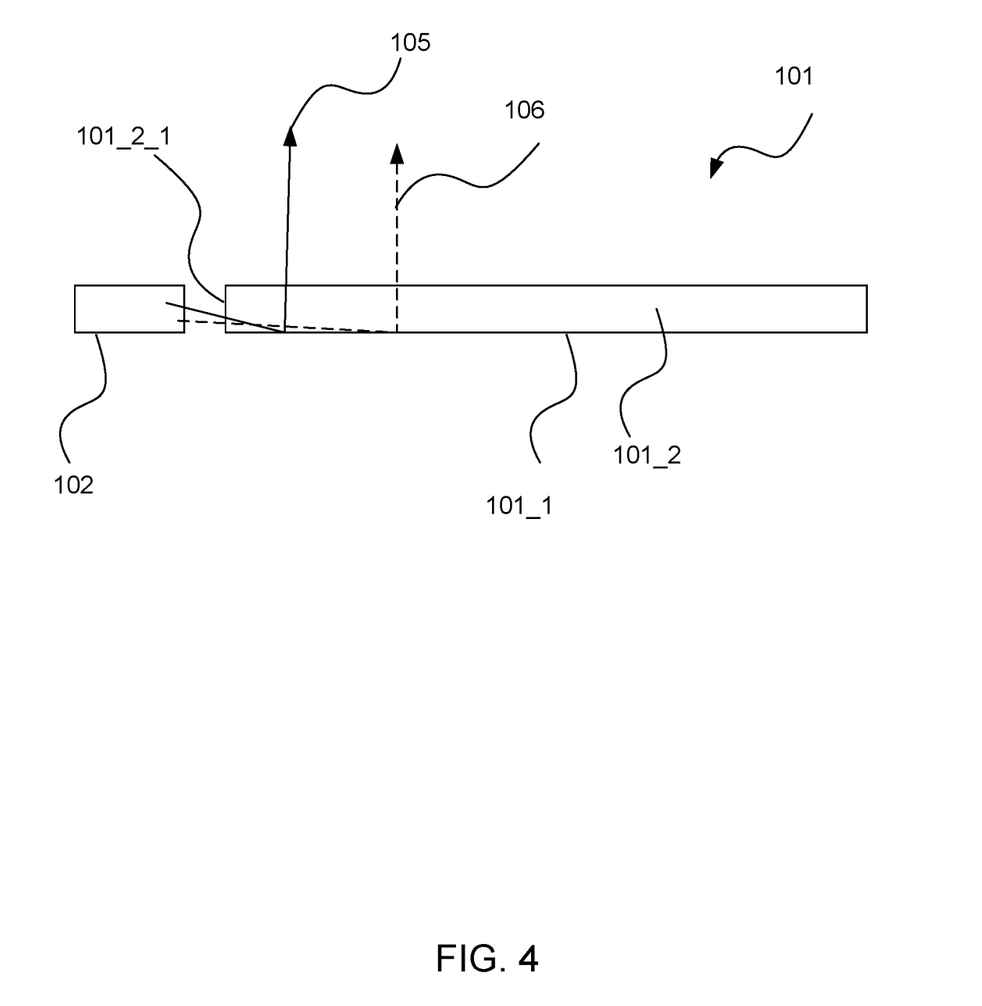
FIG. 4 illustrates a schematic representation of a cross-section of a side view of an integrated visible light and infrared source and a light guide panel according to an embodiment.

FIG. 4 illustrates a schematic representation of a cross-section of a side view of a radiation source 102 and a light guide panel 101_2 according to an embodiment.

Referring to FIG. 4, the integrated light source 102 comprising the VL source and IR source may emit VL or IR radiation 105,106 parallel to the light guide panel 101_2. The light guide panel 101_2 may receive the VL or IR radiation 105,106 through a lateral edge 101_2_1 and guide the radiation 105,106 in a direction perpendicular to the surface of display 101 such that the radiation 105,106, comprising visible and/or IR radiation, may exit the light guide 101_2 perpendicular to its surface. The light guide 101_2 may be planar in nature, configured parallel to display 101, such that radiation 105,106 exiting the light guide 101_2 passes through the display 101. Planar nature of the light guide 101_2 together with other components of the display 101 may ensure that the radiation 105,106 is radiated uniformly through the display 101. The visible part of the radiation 105 may illuminate the liquid crystals of the LCD display 101 enabling display of content while IR part of the radiation 106 may be used to illuminate a feature of a user for biometric recognition. The feature may be a finger, face, eye etc. Once illuminated by IR radiation 106, some of the radiation may be reflected back towards the device 100. An IR detector 107 may receive the reflected IR radiation. The reflected radiation may be analyzed and identifying data may be obtained from it. This identifying data may be compared to already stored and authenticated identifying data. Authentication may be based on the results of this comparison. A reflector 101_1 is located under light guide 101_2 and configured to reflect and direct the radiation 105,106 into the upward direction.

The display 101 may be configured thin due to planar light guide 102 and that the side shooting source 102, which is situated next to the planar plane of the light guide 101_2 as illustrated in FIG. 4. For example, there is no need to have the radiation source 102 under the display 101, because it may be placed right next to the display 101, and possibly be in contact with the lateral end 101_2_1. This may increase the level of integration of the device 100.

Figure 5:
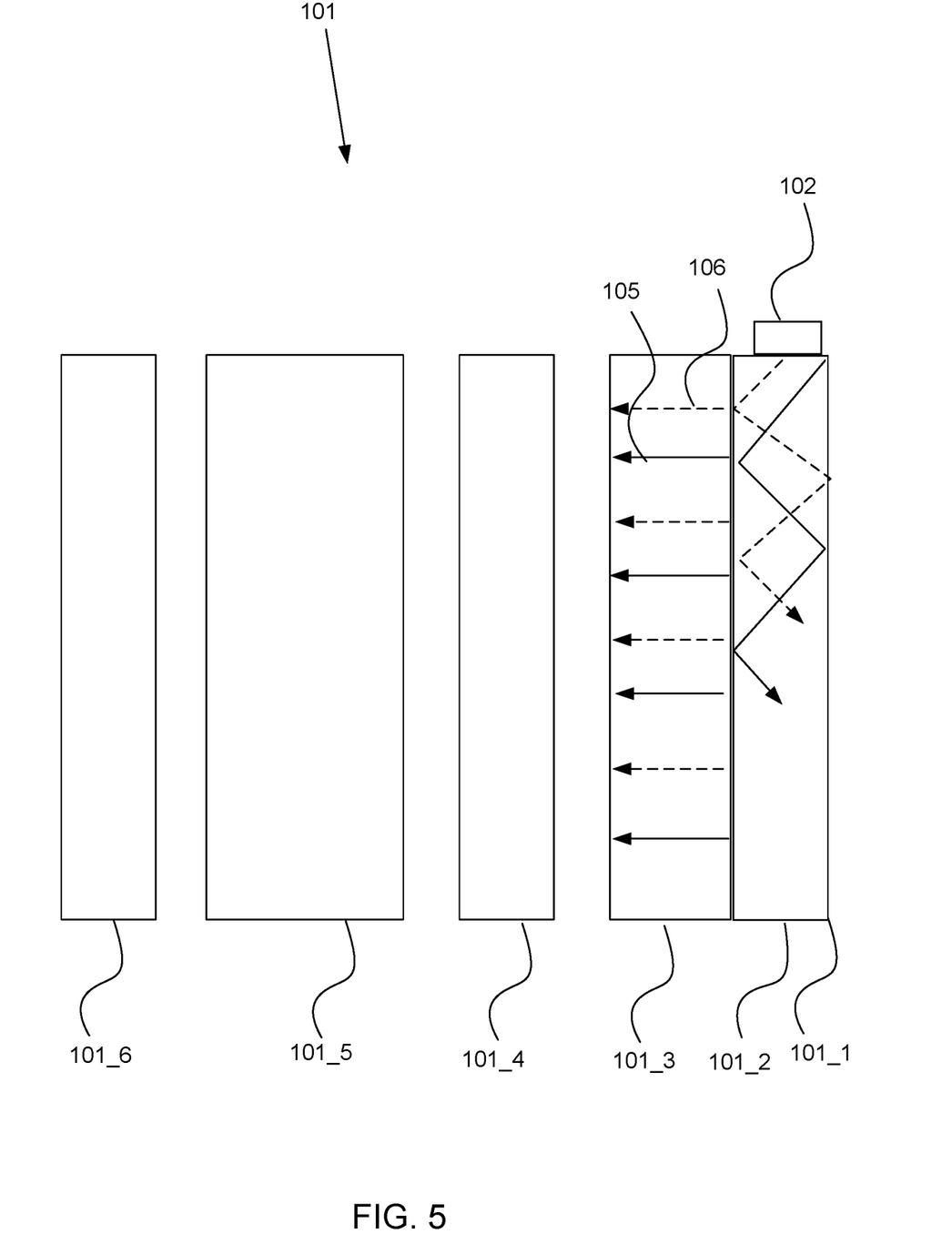
FIG. 5 illustrates a schematic representation of a cross-section of a side view of a liquid crystal display having an integrated visible light and infrared source according to an embodiment.

FIG. 5 illustrates a schematic representation of a cross-section of a liquid crystal display, LCD, 101 according to an embodiment. The display 101 comprises the integrated VL and IR source 102. The source 102 is located in a planar plane next to the light guide panel 101_2. Source 102 may be at the end of the light guide panel 101_2 and may be in contact within. The source 102 may be configured as a backlight of the display 101. The source 102 is configured as the side-shooting source in the embodiment of FIG. 5. The display 101 comprises furthermore a diffuser panel 101_3, a polarizing plate 101_4, a LC cell 101_5, and another polarizing plate 101_6. The order and configuration is illustrated in the embodiment of FIG. 5. These layers may be typical for LCD.

Figure 6:
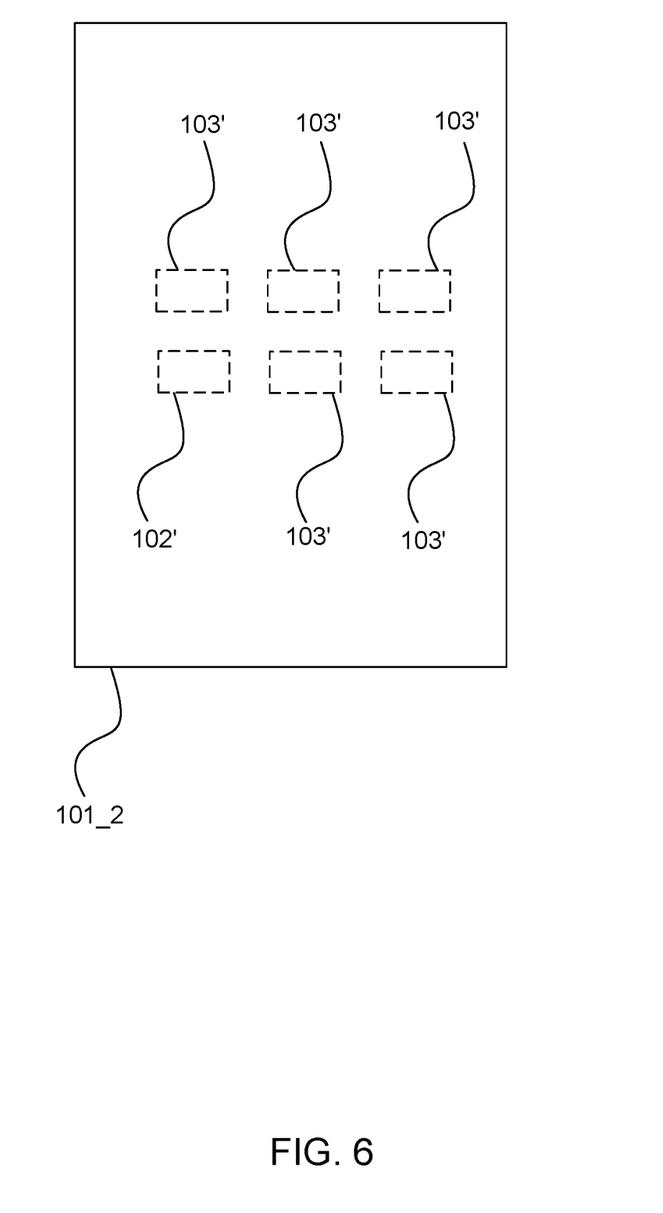
FIG. 6 illustrates a schematic representation of a cross-section of a top view of a light guide panel comprising an integrated infrared and visible light source for biometric authentication, according to another embodiment.

FIG. 6 illustrates a schematic representation of a cross-section of a top view of a light guide panel 101_2 comprising an integrated infrared and light source 102' for biometric authentication, according to another embodiment. Embodiment of FIG. 6 illustrates top shooting sources 102',103', which are emitting radiation though the light guide panel 101_2. The sources 102',103' are located under the light guide panel 101_2 and they are illustrated by dashed blocks accordingly. Embodiment of FIG. 6 may enable smaller bezels or skirts at the device surface next to the display 101, because the sources 102',103' are located under the light guide panel 101_2.

Figure 7:
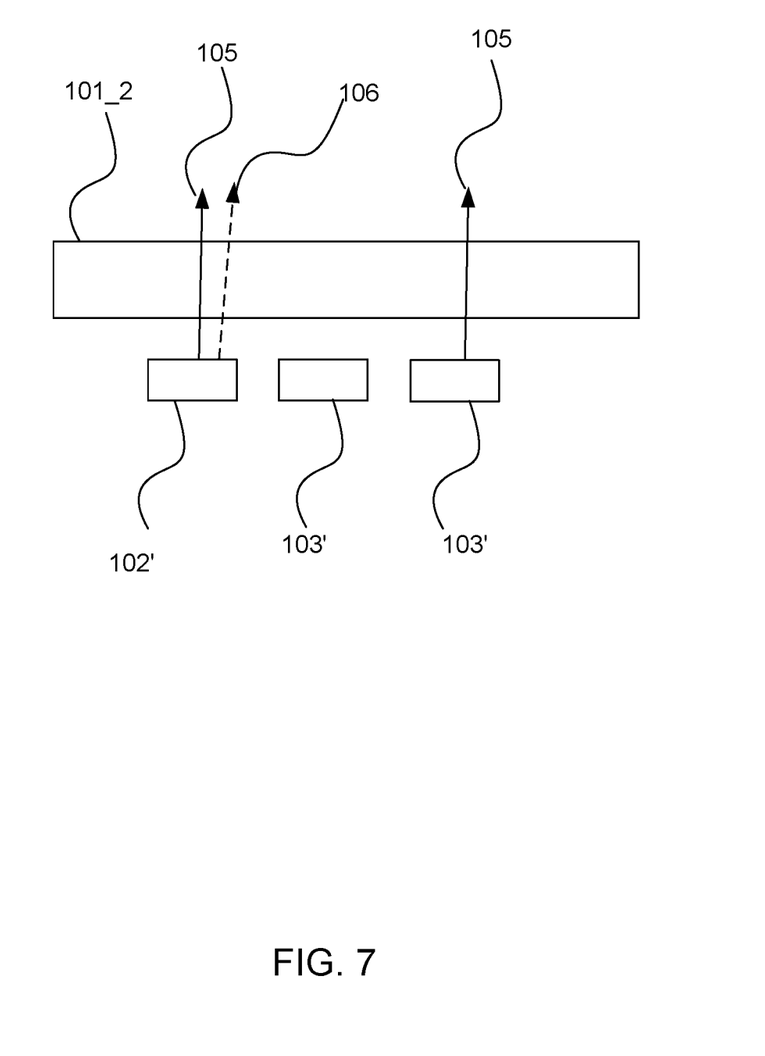
FIG. 7 illustrates a schematic representation of a cross-section of a side view of an integrated visible light and infrared source and a light guide panel according to another embodiment.

FIG. 7 illustrates a side view of the top shooting sources. The integrated VL and IR source 102' and VL sources 103' are emitting VL and/or IR radiation 105,106 thought the light guide panel 101_2.

Figure 8:
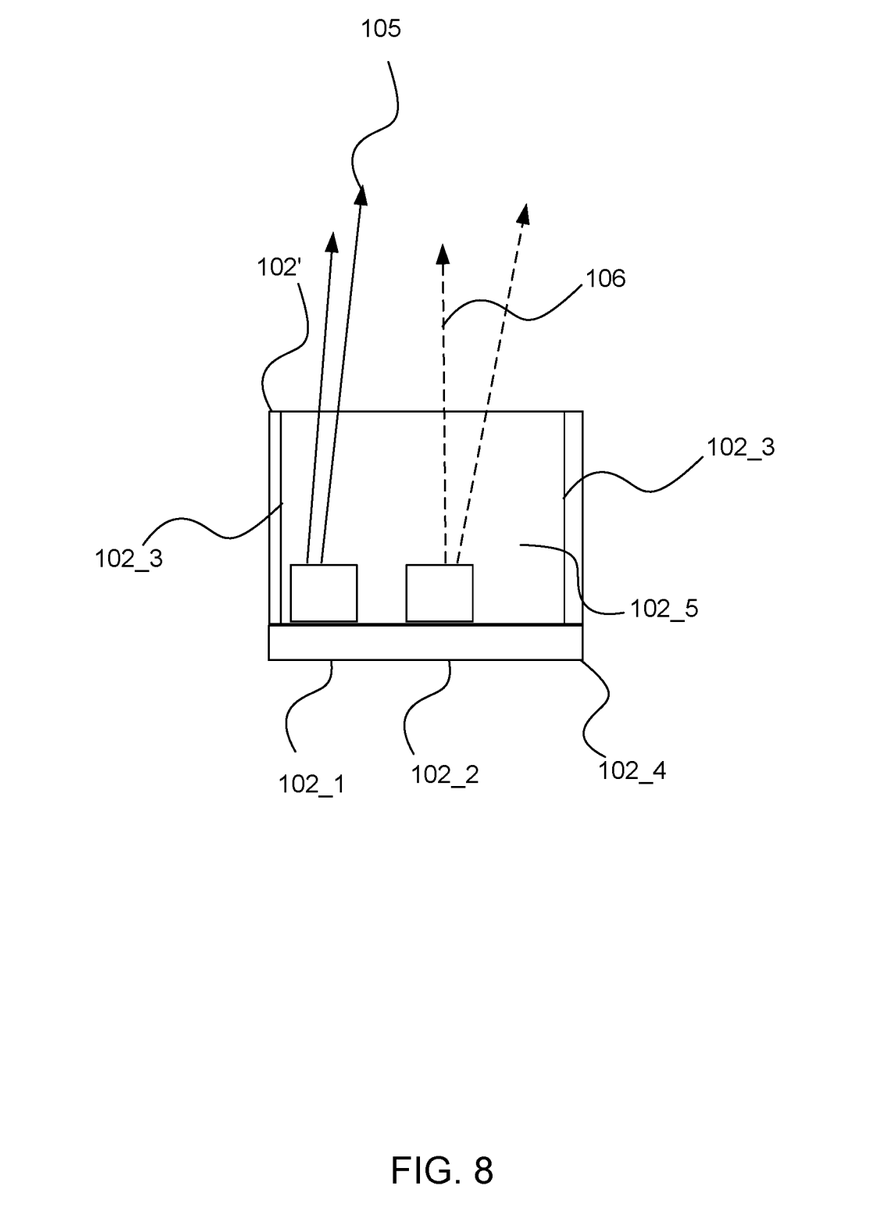
FIG. 8 illustrates a schematic representation of a cross-section of side view of a radiation source comprising integrated visible light source and infrared source according to another embodiment.

FIG. 8 illustrates a schematic representation of a side view of integrated VL and IR source 102', which is configured for top-shooting the radiation. The integrated VL and IR source 102' comprises VL component 102_1 and IR component 102_2. The components are integrated within a single electronics component as a radiation source 102' for the display 101. The single source 102' may be integrated into the display 101. VL component 102_1 emits visible light radiation 105. IR component 102_2 emits IR radiation 106. According to an embodiment, the source 102' may be a single electronics component such as a chip having both VL component 102_1 and IR component 102_2 that are integrated into the same chip. Embodiment of FIG. 7 illustrates a top shooting source 102'. It comprises reflectors 102_3 configured to direct the radiation output from above of the source 102'. The outputting top may face and/or be in contact with the light guide panel 101_2 as illustrated in FIG. 7. The integrated VL and IR source 102 comprises a common substrate 102_4 for the components 102_1,102_2. Furthermore phosphor 102_5 may be used as a filling within the source 102'.

Figure 9:
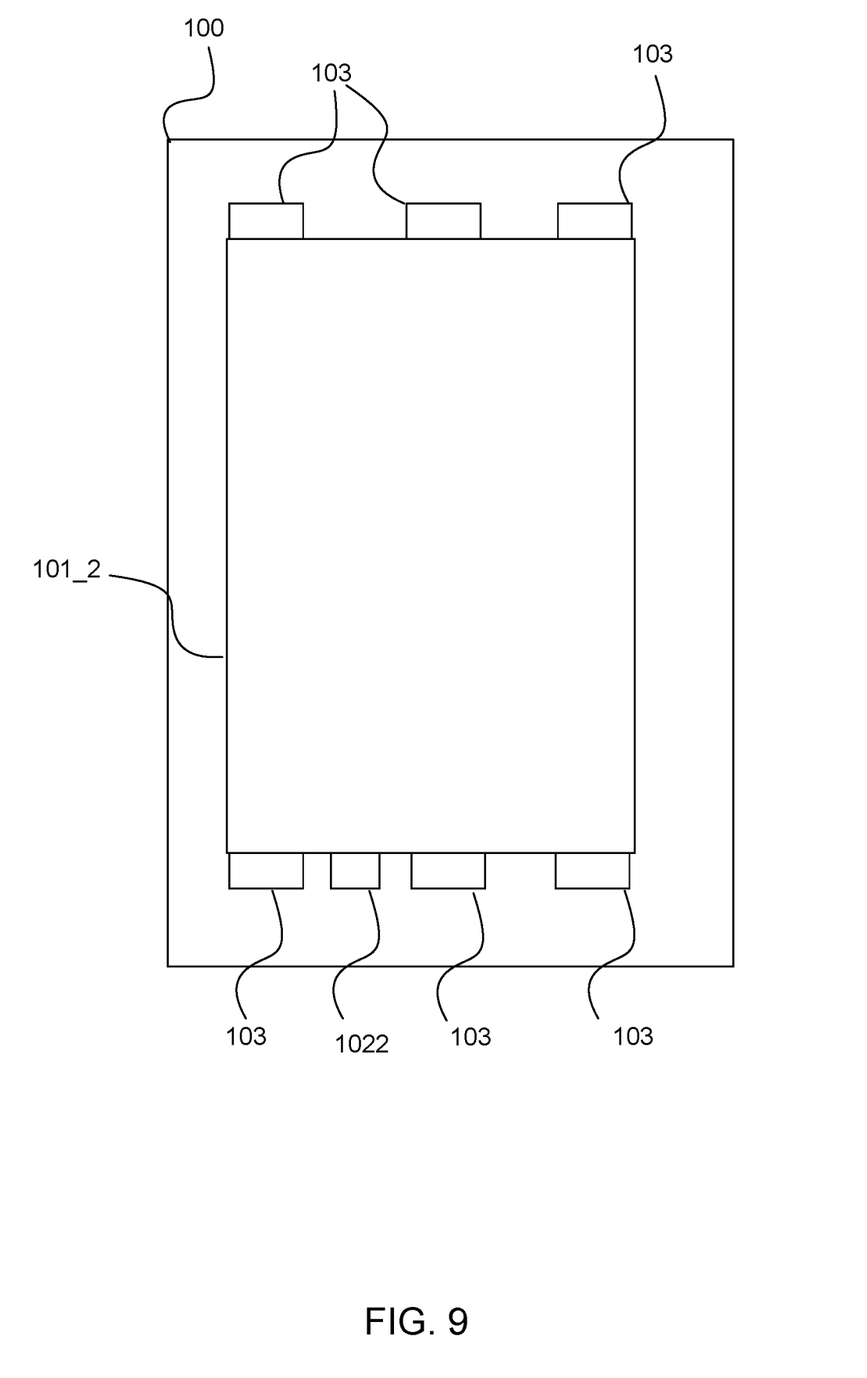
FIG. 9 illustrates a schematic representation of a cross-section of a top view of a device comprising a display integrated infrared and visible light source for biometric authentication, according to another embodiment.

FIG. 9 illustrates a schematic representation of a cross-section of a top view of a device 100 comprising a display integrated infrared and light source for biometric authentication, according to another embodiment.

Display 101 of the embodiment of FIG. 9 comprises an additional IR source 1022. The IR source 1022 may be positioned between VL sources 103, for example as illustrated in FIG. 9. The additional IR source 1022 may be a different component from the VL source 103 and they are not integrated into the same unit or electronics component. However, the additional IR source 1022 and the VL source 103 are integrated into the display 101. The sources 1022, 103 are configured to a side shooting position, and they may be in contact or in proximity to the light guide panel 101_2.

The additional IR source 1022 may be IR-LED configured to IR radiation or near IR spectrum radiation configured to biometric authentication. When display 101 is used normally, VL sources 103 are on and IR source 1022 is off. When biometric authentication is used, IR source 1022 is on and VL sources 103 are off. Light guide panel 101_2 operates similarly for IR source 1022 than for VL sources 103.

It should be noted that FIGS. 1 to 9 are for illustrative purposes only and any dimensions or relative sizes so illustrated are for representative purposes only and should not be construed as limitations. Further it should be noted that some or all the components illustrated in FIGS. 1 to 9 may or may not be to scale.

Figure 10:
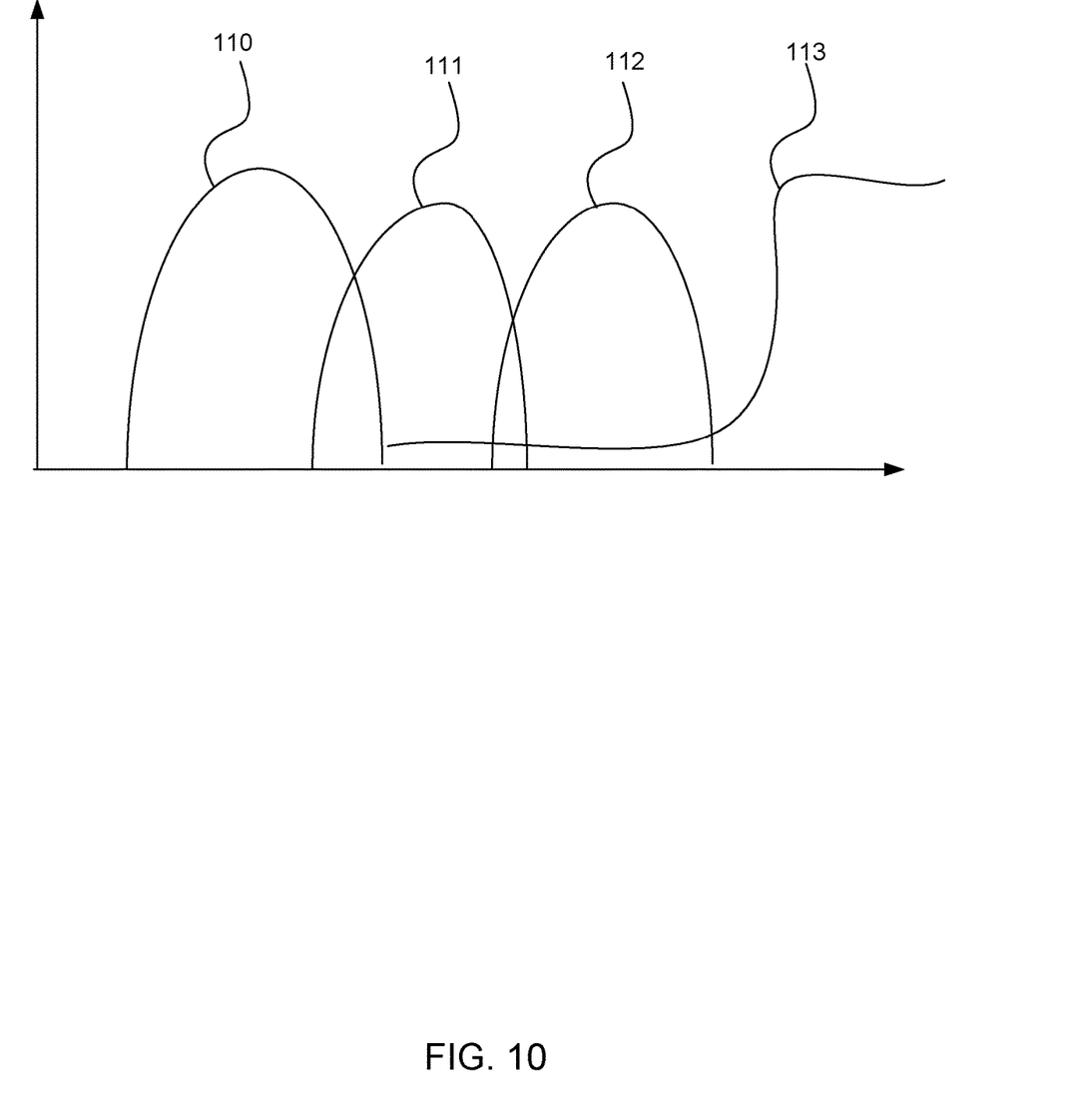
FIG. 10 illustrates a schematic representation of filter characteristics of a display filter according to an embodiment.

FIG. 10 illustrates a schematic representation of filter characteristics of a display filter according to an embodiment. Blue B 110, Green G 111 and Red R 112 filter curves are shown in FIG. 10 and they illustrate a typical display filter. Furthermore, the display filter is configured to IR 113 filter. Consequently, the display 101 passes through IR radiation 106 and VL radiation 105. According to another embodiment, RGB filter matrix may be configured so that one pixel passes IR-light and this pixel is active during identification when IR sources are active.

Figure 11:
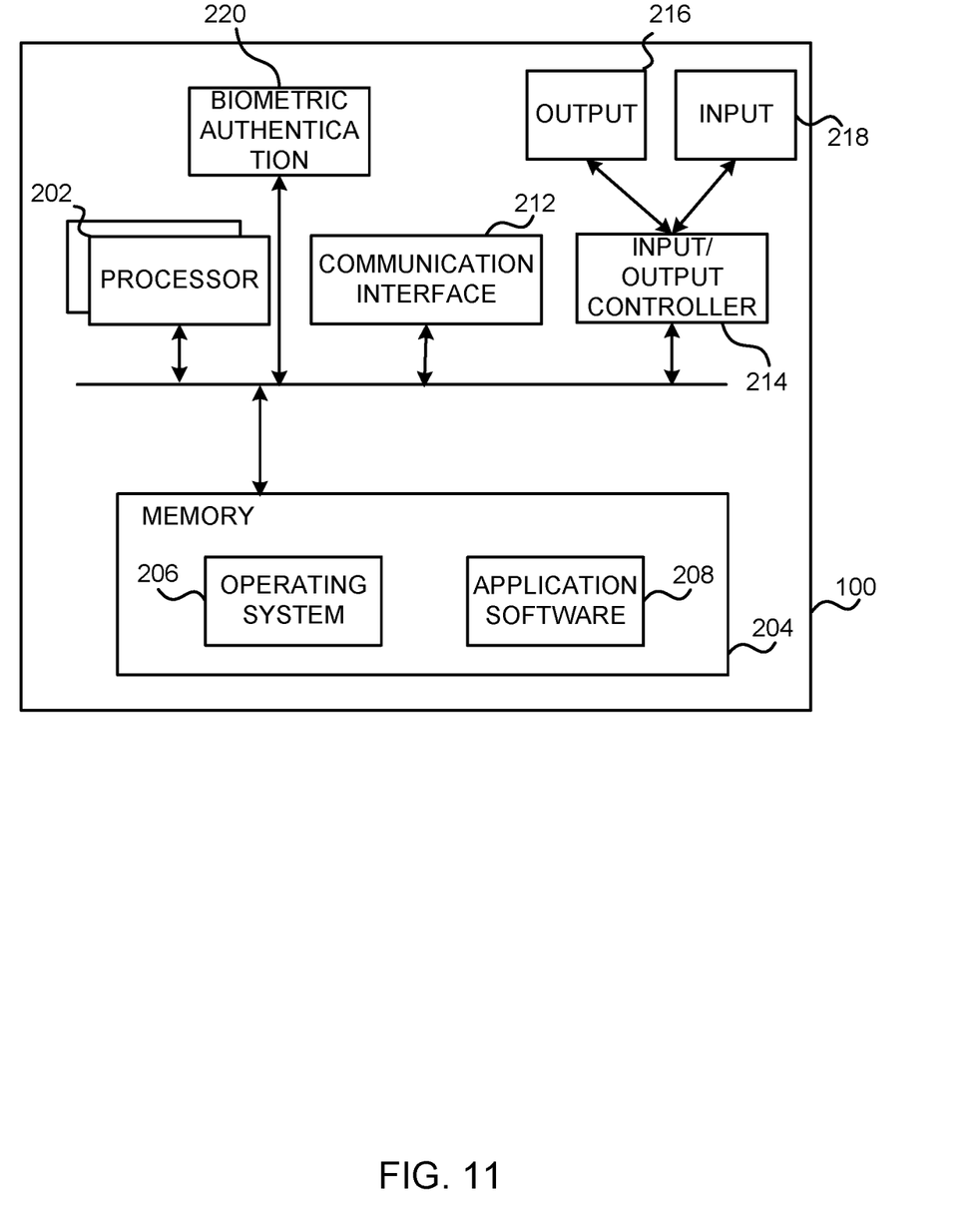
FIG. 11 illustrates a schematic representation of a device comprising a biometric authentication module and output having a display integrated infrared source for biometric authentication, in accordance with an embodiment.

FIG. 11 illustrates an embodiment of components of a device 100 which may be implemented as a form of a computing and/or electronic device. The device 100 comprises one or more processors 202 which may be microprocessors, controllers or any other suitable type of processors for processing computer executable instructions to control the operation of the device 100. Platform software comprising an operating system 206 or any other suitable platform software may be provided on the apparatus to enable application software 208 to be executed on the device 100.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, or program modules. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, in a modulated data signal, such as a carrier wave, or other transport mechanism. Although the computer storage medium (the memory 204) is shown within the device 100, it will be appreciated that the storage may be distributed or located remotely and accessed via a network or other communication link (e.g. using a communication interface 212). As defined herein, computer storage media do not include communication media. Therefore, a computer storage medium should not be interpreted to be a propagating signal per se.

The device 100 may comprise an input/output controller 214 arranged to output information to an output device 216 which may be separate from or integral to the device 100. The input/output controller 214 may also be arranged to receive and process an input from one or more input devices 218. In one embodiment, the output device 216 may also act as the input device. The input/output controller 214 may also output data to devices other than the output device, e.g. a locally connected printing device. According to an embodiment, the device 100 comprises a biometric authentication module 220. The module 220 may be configured to perform the biometric authentication process. For example, the module 220 receives from input 218 data from IR detector 107. The output 216 may emit IR radiation by the IR source 102,102',1022. For example, the output 216 may include the IR source 102,102,1022' and the input may include IR detector 107.

Once the device 100 has determined the biometric authentication process by the module 220, the device 100 act accordingly. For example, the user of the device 100 may be authenticated for further operations and functionalities of the device 100.

The functionality described herein can be performed, at least in part, by one or more hardware logic components. According to an embodiment, the computing device 100 is configured by the program code 206,208 when executed by the processor 202 to execute the embodiments of the operations and functionality described. For example, the biometric authentication module 220 may be performed by the program code 206,208. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought, or without extending beyond the disclosure.

The term 'comprising' is used herein to mean including the method, blocks or elements identified, but that such blocks or elements do not comprise an exclusive list and a method or apparatus may contain additional blocks or elements.

According to an embodiment, a device, comprising: a display, comprising: a visible light source; and an infrared source, the visible light source and the infrared source being integrated into a single radiation source component within the display, and the infrared source emitting an infrared radiation biometrically authenticating a user of the device.

Alternatively or in addition to the above, single radiation source component comprises a single chip having integrated visible light and infrared sources. Alternatively or in addition to the above, a single substrate unites the infrared and visible light sources. Alternatively or in addition to the above, further including an infrared detector configured to detect the infrared radiation which is reflected from the user of the device for the biometric authentication. Alternatively or in addition to the above, further including a biometric authentication module configured to perform the biometric authentication of the user of the device on a basis of the detected infrared radiation. Alternatively or in addition to the above, the device comprises a single device having the infrared source, the infrared detector and the biometric authentication module within the single device. Alternatively or in addition to the above, the singe device comprises a single portable hand held wireless device. Alternatively or in addition to the above, the single device comprises a mobile device. Alternatively or in addition to the above, the component is configured for top shooting the radiation from top of the component. Alternatively or in addition to the above, the component is configured for side shooting the radiation from a side of the component. Alternatively or in addition to the above, further including a filter of the display which is configured to pass the infrared radiation. Alternatively or in addition to the above, the filer comprises a red, green, blue filter which configured to pass the infrared radiation. Alternatively or in addition to the above, the filter comprises a pixel which is configured to pass the infrared radiation, and the pixel is configured to be activated when the infrared source is activated. Alternatively or in addition to the above, the visible light source and the infrared source are configured as a backlight of the display. Alternatively or in addition to the above, when the visible light source is on the infrared source is off, and when the visible light source is off the infrared source is on.

According to an embodiment, a device, comprising: an infrared detector; and a display, comprising: a backlight comprising a visible light source and infrared source; and a light guide panel, wherein the light guide panel is configured to guide radiation from the backlight from a parallel direction to a transversal direction with respect to the display; wherein the display is configured to allow infrared radiation to pass through it and the infrared detector is configured to receive reflected infrared radiation from a user of the device for biometric authentication of the user.

Alternatively or in addition to the above, radiation from the visible light source and the infrared source enter the light guide from an edge of the light guide and exits from a top surface of the light guide. Alternatively or in addition to the above, the top surface of the light guide, wherefrom the radiation exits, is configured to be parallel to layers establishing the display.

Alternatively or in addition to the above, the infrared source and the visible light source are integrated to each other into a single component.

According to an embodiment, a mobile device, comprising: an infrared detector; and a display, comprising: a backlight comprising a visible light source and infrared source; and a light guide panel substantially conforming to a shape of the display, wherein the light guide panel is configured to guide radiation from the backlight source both in a direction parallel and transversal to the display; wherein the display is configured to allow infrared radiation to pass through it and the infrared detector is configured to receive reflected infrared radiation for biometric authentication of a user of the mobile device.

The embodiments illustrated and described herein as well as embodiments not specifically described herein but within the scope of aspects of the disclosure constitute exemplary means for integrating visible light and infrared radiation into a display. For example, the elements illustrated in FIG. 1 to FIG. 11 constitute exemplary means for integrating infrared source and visible light source as a single electrical component, means for biometrically authenticating a user of the device, means for integrating infrared radiation source into the display.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
    a display, comprising:
    a light guide panel having a first surface and a second surface, the first surface facing an exterior of the device and the second surface facing an interior of the device;
    a single radiation source component comprising a visible light source, an infrared source, and a reflector, the single radiation source component positioned adjacent to the second surface of the light guide panel;
    a plurality of only visible light sources separate from the single radiation source component, the plurality of only visible light sources positioned adjacent to the second surface of the light guide panel;
    the infrared source configured to emit an infrared radiation to biometrically authenticate a user of the device; and
    a filter of the display that is configured to pass the infrared radiation emitted from the infrared source;
    wherein the reflector is positioned within the single radiation source component and is configured to reflect light from both the visible light source and the infrared source out of the single radiation component source and through the light guide panel.

2. The device of claim 1, wherein the single radiation source component is filled with phosphor.

3. The device of claim 2, wherein a single substrate unites the plurality of infrared sources and visible light sources.

4. The device of claim 1, further including an infrared detector configured to detect the infrared radiation which is reflected from the user of the device for the biometric authentication.

5. The device of claim 4, further including a processor configured to act as a biometric authentication module to perform the biometric authentication of the user of the device on a basis of the detected infrared radiation.

6. The device of claim 5, wherein the device comprises a single device having the infrared source, the infrared detector and the biometric authentication module within the single device.

7. The device of claim 6, wherein the single device comprises a single portable hand held wireless device.

8. The device of claim 7, wherein the single radiation source component further comprises a single chip integrating the visible light source and the infrared source.

9. The device of claim 1, wherein the single radiation source component is configured for top shooting the radiation from top of the component.

10. The device of claim 1, wherein the single radiation source component is configured for side shooting the radiation from a side of the component.

11. The device of claim 1, wherein the filter comprises a red, green, blue filter which configured to pass the infrared radiation.

12. The device of claim 1, wherein the filter comprises a pixel which is configured to pass the infrared radiation, and the pixel is configured to be activated when the infrared source is activated.

13. The device of claim 1, wherein the light guide panel is configured to reflect light from both the visible light source and the infrared source after the light from both the visible light source and the infrared source are reflected by the reflector.

14. A device, comprising:
an infrared detector; and
a display, comprising:
a light guide panel having a first surface and a second surface, the first surface facing an exterior of the device and the second surface facing an interior of the device;
a single radiation source component comprising a visible light source, an infrared source, and a reflector, the single radiation source component being positioned adjacent to the second surface of the light guide panel;
a plurality of only visible light sources separate from the single radiation source component, the plurality of only visible light sources positioned adjacent to the second surface of the light guide panel; and
wherein the display is configured to allow infrared radiation to pass through it and the infrared detector is configured to receive reflected infrared radiation from a user of the device for biometric authentication of the user, wherein the reflector is positioned within the single radiation source component and is configured to reflect light from both the visible light source and the infrared source out of the backlight and onto the light guide panel.

15. The device of claim 14, wherein radiation from the visible light source and the infrared source enter the light guide panel from an edge of the light guide panel and exits from a top surface of the light guide panel.

16. The device of claim 15, wherein the top surface of the light guide panel, wherefrom the radiation exits, is configured to be parallel to layers establishing the display.

17. A mobile device, comprising:
an infrared detector; and
a display, comprising:
a light guide panel having a first surface and a second surface, the first surface facing an exterior of the device and the second surface facing an interior of the device;
a single radiation source component comprising a visible light source, an infrared source, and a reflector; the single radiation source component being positioned adjacent to the second surface of the light guide panel, and wherein the reflector is positioned within the single radiation source component and is configured to reflect light from both the visible light source and the infrared source out of the single radiation source component and onto the light guide panel;
a plurality of only visible light sources separate from the single radiation source component, the plurality of only visible light sources positioned adjacent to the second surface of the light guide panel;
the light guide panel substantially conforming to a shape of the display; and
a filter of the display;
wherein the display is configured to allow infrared radiation to pass through it and the infrared detector is configured to receive reflected infrared radiation for biometric authentication of a user of the mobile device, and wherein the filter is configured to pass the infrared radiation emitted from the infrared source.

18. The mobile device of claim 17, wherein the filter comprises a pixel which is configured to pass the infrared radiation, and the pixel is configured to be activated when the infrared source is activated.

19. The mobile device of claim 17, wherein radiation from the visible light source and the infrared source enter the light guide panel from an edge of the light guide panel and exits from a top surface of the light guide panel.

20. The mobile device of claim 19, wherein the top surface of the light guide panel, wherefrom the radiation exits, is configured to be parallel to layers establishing the display.

\* \* \* \* \*